United States Patent [19]

Witt et al.

[11] 4,223,835
[45] Sep. 23, 1980

[54] TRACTION PAD

[76] Inventors: Michael Witt, 106 Avenue P, Brooklyn, N.Y. 11204; Seymour Brawer, 4706 Arthur St., Hollywood, Fla. 33021

[21] Appl. No.: 953,628

[22] Filed: Oct. 23, 1978

[51] Int. Cl.² .......................................... E01B 23/00
[52] U.S. Cl. .................................................... 238/14
[58] Field of Search .............. 238/14; 152/208, 213 R

[56] References Cited

U.S. PATENT DOCUMENTS

| | | | |
|---|---|---|---|
| 1,375,666 | 4/1921 | Bauer | 238/14 |
| 1,400,478 | 12/1921 | Deschamps | 238/14 |
| 1,425,101 | 8/1922 | Jury | 238/14 |
| 2,486,911 | 11/1949 | Becker | 238/14 |
| 2,975,977 | 3/1961 | Chodacki et al. | 238/14 |
| 3,202,358 | 8/1965 | Griswold | 238/14 |
| 3,630,440 | 12/1971 | Sams | 238/14 |
| 3,836,075 | 9/1974 | Botbol | 238/14 |
| 3,910,491 | 10/1975 | Ducharme | 238/14 |

Primary Examiner—John J. Love
Assistant Examiner—Ross Weaver
Attorney, Agent, or Firm—Friedman, Goodman & Teitelbaum

[57] ABSTRACT

A traction pad for use with vehicle tires on slippery road surfaces, the pad having a rectangular plastic mat portion with one end provided with a wedge shape. The tire facing surface of the mat, including the wedge portion, is provided with groups of substantially conically shaped projections. The opposite road facing surface of the mat portion is provided with like projections, with the wedge portion of the road facing surface being provided with longitudinal ribs. The size of the conical projections within each group is uniform, with one group size being larger than an adjacent group, the larger group being further from the wedge portion. A cooperating metallic starter plate is disposed on the wedge portions, being bent over the one end so that the conical projections on the wedge portion of the tire facing surface extend into openings in one side of the plate, and the ribs on the wedge portion of the road facing surface extend between grooves in the other side of the plate. Preferably, the plate is secured to the mat portion by rivets.

9 Claims, 8 Drawing Figures

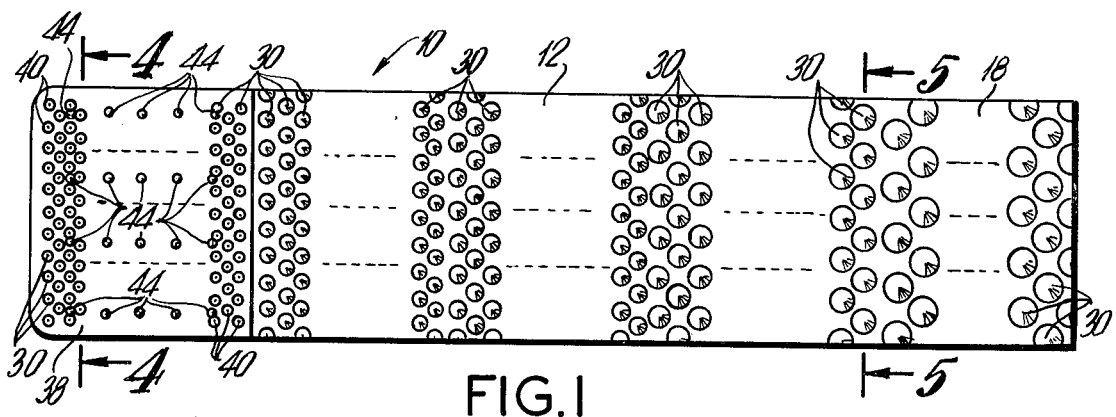
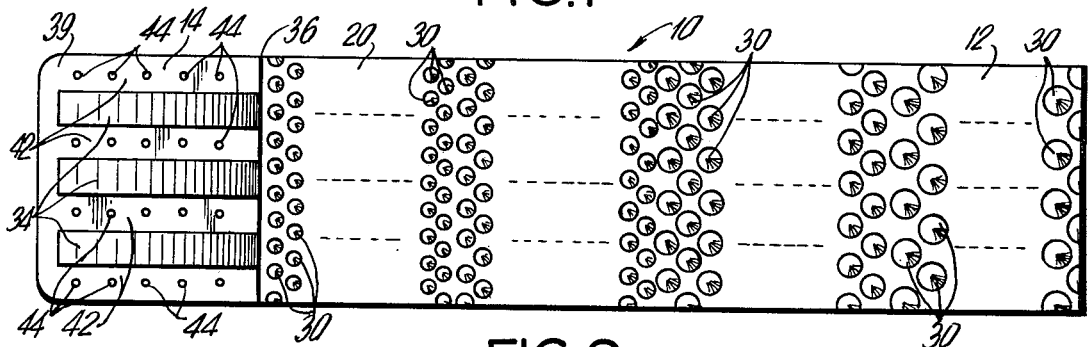
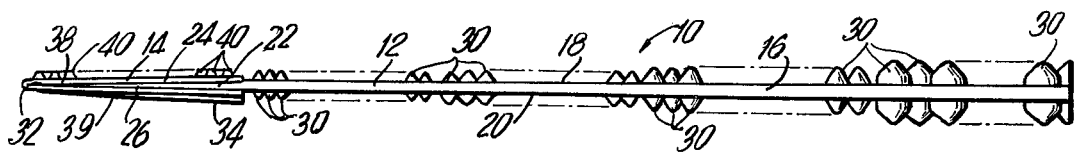
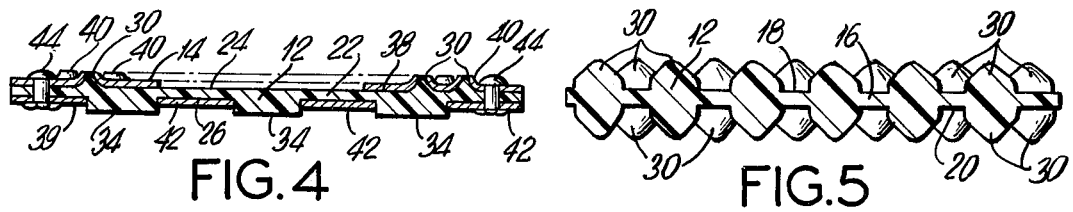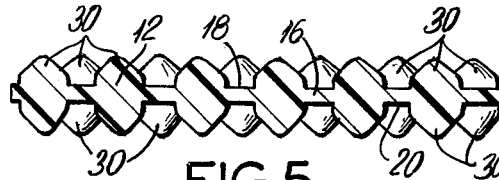
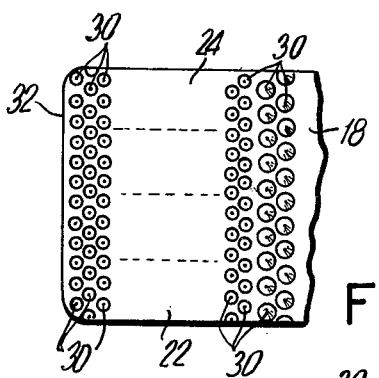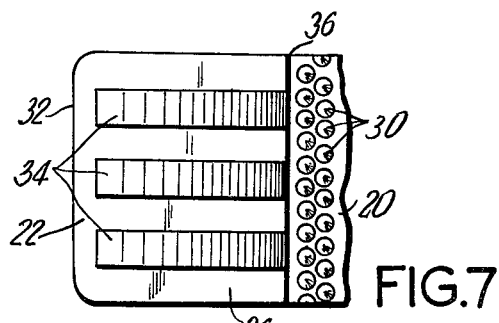
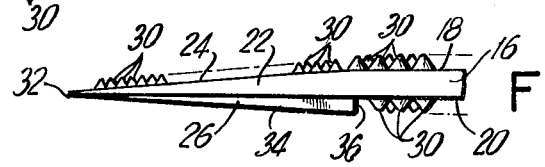

TRACTION PAD

BACKGROUND OF THE INVENTION

This invention relates to flexible traction pads adapted to be placed under tires of a vehicle when the vehicle is immobilized on ice or snow.

Automobile operators who have driven in ice or snow conditions, invariably become familiar with the difficulties inherent in starting the vehicle from a standstill position when the road surface is icy or covered with snow. Through proper application of engine power, it is generally possible to start and drive the vehicle. However, on icy road surfaces, or under various snow conditions, the vehicle's wheels upon starting tend to slip when the car is placed in gear and the driver applies pressure to the accelerator.

Several devices have been produced with the objective of preventing tire slippage and providing traction to the vehicle when attempting to start it on icy or snowy roads. Each of these devices includes some form of metallic, rubberized or plasticized mat with metallic gripping surfaces which engage the road. Each of these has a common drawback, in that in order to provide a gripping surface toward the roadway, the mats have metallic protuberances embedded therein, or are completely constructed of metal. The mats with such metallic parts require a multi-step construction process wherein the metallic ridges or studs are embedded in the mat during the manufacturing process. A person using these mats must place them snugly against the area of contact between the tire and ice or snow. When the wheels spin, the mat may be propelled around them, where through an abrasive cutting action, the metallic protuberances can damage the auto body.

U.S. Pat. No. 1,815,435 discloses a traction pad comprising a rubber mat into which are embedded and enveloped a number of longitudinal metal core pieces to provide longitudinal stiffness to the mat. Portions of the core pieces are partially severed in a staggered arrangement and then bent down in the same direction to provide traction calks. Preferably, corresponding calks of the core pieces are aligned with each other to provide rib-like surfaces extending across the width of the traction pad.

In U.S. Pat. No. 2,428,680, a traction mat is provided in which the base of the mat is provided with rows of slots which are designed to receive cleats or lugs which extend downwardly from the lower surface of the mat. The particular design of these cleats or lugs requires several steps of manufacture prior to their insertion into the traction mat.

U.S. Pat. No. 3,640,459 describes a traction pad comprising a flat flexible mat formed with transverse treads on its upper surface. Studs are embedded in the mat and extend out of the bottom surface for engagement with the roadway. The mat is provided with holes within which the studs are inserted, and the studs themselves have a cylindrical body with a reduced diameter cylindrical pin portion. Ridges are provided on the bottom surface of the mat between rows of protruding stud pin portions to cooperate with the studs during operation.

In each of these disclosures, the traction mat is manufactured in several steps requiring generally an insertion of the metallic gripping elements into a pad-like support mat. The metallic gripping elements are generally produced through a process comprising several steps prior to their application to the traction mat.

SUMMARY OF THE INVENTION

It is accordingly an object of the present invention to provide a traction pad which avoids the aforementioned problems of prior art devices.

A further object of the present invention is to provide a traction pad which is manufactured in a simple manner, without metallic road gripping surfaces incorporated therein.

Still another object of the present invention is to provide a traction pad which utilizes each protuberance of the plastic pad as a gripping contact, yet does not require any metallic road gripping surface for such purposes.

Yet another object of the present invention is to provide a flexible traction pad which is simple in construction, inexpensive to manufacture, easy to use, efficient and practical.

Briefly, the present invention provides a flexible, tire traction pad for use on ice or snow, the pad comprising a rectangular plastic body member fabricated from a one-piece mold and a metal plate substantially of like width as the pad, the plate being attached at one end of the body member. The plate has slightly raised hollow circular portions on one side to facilitate initial contact with a tire surface, and finger-like projections which are folded around one edge of the pad, the plate being secured to the body member by fastening means. Transverse rows of conical shaped protuberances are provided along the longitudinal length of the body member and extend perpendicularly outwardly from both faces of the pad. Sets of the protuberances proportionally increase in height and width, with the largest set being the most remote from the metal starting plate edge, and the smallest set being disposed in the hollow circular portions of the plate.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a top plan view of a preferred embodiment of the traction pad, according to the present invention;

FIG. 2 is a bottom plan view of the traction pad;

FIG. 3 is a side elevational view of the traction pad;

FIG. 4 is a cross sectional view taken along line 4—4 of FIG. 1;

FIG. 5 is a cross sectional view taken along line 5—5 of FIG. 1;

FIG. 6 is a top plan view of a fragmented portion of a modified traction pad, according to the present invention, showing the metal plate removed therefrom;

FIG. 7 is a bottom plan view of the fragmented portion of the modified traction pad shown in FIG. 6; and FIG. 8 is a side elevational view of the fragmented portion of the modified traction pad in FIG. 6.

DETAILED DESCRIPTION OF THE PREFERRED EMBODIMENT

Referring first to FIGS. 1 and 2, there is shown a substantially rectangular traction pad 10 of the present invention. The traction pad includes a plastic mat or body member 12 and, in the preferred embodiment of the invention, a cooperating metallic starter plate 14 secured by fastening means to the surfaces of one end portion of body member 12.

The body member 12 is molded, being plastic, rubber, or the like, and is generally rectangular in shape. The body member can be molded in large sheets and then cut down to predetermined width size. It is preferably to select a pad width which enables the complete width of a vehicle's tire to pass onto the pad 10.

As shown in FIG. 3, the body member 12 of the mat 10 includes a major section of relatively uniform thickness 16 having an upper surface 18 and a lower surface 20. At one end, an adjacent minor section 22 is tapered, thereby forming a wedge-shaped end portion. The tapered upper surface 24 of the wedge section 22 and the upper surface 18 are the tire facing surface of the mat 12. The lower surface 26 of wedge section 22 and the lower surface 20 of the mat 12 are the road facing surface.

During the molding of the traction mat, a multiplicity of substantially conical projecting portions 30 is provided on the lower surface 20 and the upper surfaces 18 and 24, extending across the full length and width of these surfaces 18, 20 and 24. As shown in FIGS. 3–5, the projections are generally conical in shape with slightly rounded ends, thereby protecting the person using the pad from possible injury during the handling of the pad and also preventing the projections from damaging the tire through scratching, tearing, puncturing or other contact when the vehicle is driven over the pad.

On surfaces 18 and 20 of section 16, the upper and lower projections 30 are grouped in sets of pre-selected lengths and molded of relatively uniform dimension within each such set. The projections 30 in each group or set are arranged in transverse rows disposed across the width of the mat 12, with the rows being spaced apart longitudinally along the length of the mat 12.

As best shown in FIG. 3, the dimensions of the projections of adjacent groups or sets are increased in relation to the distance of the particular group or set from the wedge end 32.

As shown in FIGS. 2 and 3, the wedge section 22 is provided on its road surface 26 with several parallel, longitudinally extending, projecting tapered rib portions 34 which increase gradually in height from the edge 32. These rib portions 34 extend to transverse line 36, where the wedge section 22 joins substantially uniform thickness section 16.

As best shown in FIG. 8, the relative maximum height of the rib portions 34 is approximately that of the adjacent conical projections 30 of section 16, and the relative height of the conical projections 30 on the tire surface 24 of the wedge section 22 is slightly less than that of the adjacent conical projections 30 on the section 16.

Preferably, the starter plate 14 is provided to engage both the tire surface 24 and the road surface 26 of the wedge section 22. The plate is fabricated from a suitable material, such as a metallic sheet, having upper and lower portions 38, 39, respectively, the same length and width as that of the wedge section 22. Projecting circular hollow ridges 40 are provided on the upper sheet portion 38 in identical relationship to that of the projections 30 on wedge surface 24, as best shown in FIG. 4. The height of circular ridges 40 above the wedge surface 24 is identical to that of projections 30 above wedge surface 24. The plate 14 is bent conformably around edge 32 of the wedge section 22. The lower sheet portion is provided with projecting finger portions 42 to define grooves therebetween. The finger portions 42 are positioned onto the wedge surface 26 in the parallel spaces provided between the projecting ribs 34. Securing means, such as rivets 44, are used to attach the starter plate and fingers to the wedge section 22.

As best shown in FIG. 3, the pad 10, when ready for use, is a relatively flat body with a series of groupings of projections 30 upon each of its surfaces. Upon the tire and road facing surfaces, the series of sets of conical projections 30 increase in relative height as the distance of each set increases from wedge edge 32.

FIG. 4 shows the relationship of the components of the wedge portion of the pad to each other. In this cross section, it can be seen that the longitudinal ribs 34 are the surfaces upon which the wedge section 22 transfers the force of tires riding upon the circular ridges 40 and conical projections 30 therein to the road. In this embodiment, the plate 14, is clearly shown as being fastened to the wedge by means of the rivets 44.

In use, the pad is placed with the wedge edge 32 against the line of contact between the tractionless tire and the road, and the vehicle is then driven onto the pad. The ribs 34 of the wedge section act to guide the tire straight onto the pad. The projections 30 on both surfaces 18 and 20 of the mat grip the road and tire securely with the metal ridges providing a staring contact for the tire, thereby enabling the vehicle to move over the slippery road surface.

In order to provide for an even distribution of pressure upon the surface of the pad when the weight of a motor vehicle is upon it, the rows of conical projections 30 are placed in a longitudinally staggered relationship with respect to each other. FIG. 5 is a view transversely across the longitudinal axis of the pad as seen by a cut across the width of the pad directly through a row of conical projections. The staggered relationship to each other of the conical projections results in an even distribution of vehicle weight over the surface of the pad.

In an alternative embodiment of the present invention, shown in FIGS. 6, 7 and 8, the pad is not provided with the metal plate 14, or fingers 42. Rather, the wedge as molded, in the same shape set forth as above, is used without any plate. A plan view of the tire facing surface 24 of the wedge is shown in FIG. 6, and the road facing surface 26 of wedge section 22 of the alternate embodiment is shown in the plan view of FIG. 7. The relationship of the projections 30 and ribs 34 on wedge section 22 to the adjacent sets of projections 30 on the uniform thickness section 16 are indicated in FIG. 8.

As the tire moves across the wedge section 22 onto the projections 30 of section 16, a great force is exerted on the projections 30 as a consequence of bearing weight of the vehicle. This force is in turn exerted upon the slippery road surface and the projections effectively hug the road surface. The vehicle can be driven back and forth over the pad a series of times, if necessary, until the vehicle is no longer slipping on the road surface.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

We claim:

1. A traction pad for use with vehicle tires disposed on a slippery road surface, said pad comprising:

a substantially rectangular mat having a tire facing surface on one side and a road facing surface on an opposite side;

an end portion provided at one longitudinal end of said mat having said tire facing and road facing surfaces thereon;

friction means disposed on said tire and road facing surfaces of said mat for engaging said mat between a tire and the slippery road surface without relative slippage therebetween;

said friction means extending across said tire facing surface of said end portion but ending short of said road facing surface of said end portion;

guiding means disposed on said road facing surface of said end portion for direction control of the tire during movement of the tire onto said end portion;

a metal plate covering said tire and road facing surfaces of said end portion; and said plate being provided with finger-like portions for cooperating with said guiding means, said guiding means including longitudinally extending, projecting ribs disposed between said finger-like portions.

2. A traction pad as claimed in claim 1, wherein said friction means are substantially conically shaped projections.

3. A traction pad as claimed in claim 2, wherein said guiding means are projecting tapered ribs.

4. A traction pad as claimed in claim 2, wherein said conically shaped projections are disposed in a longitudinally staggered relationship.

5. A traction pad as claimed in claim 4, wherein said conically shaped projections are disposed in groups of uniform dimension, said dimension of the conically shaped projections of one group being greater than an adjacent group as the distance of said one group increases from said end portion.

6. A traction pad as claimed in claim 1, wherein said mat is a one piece construction fabricated from a plastic material.

7. A traction pad as claimed in claim 1, including fastening means for securing said plate to said end portion.

8. A traction pad as claimed in claim 1, wherein said plate is provided with a multiplicity of projecting circular hollow ridges, said friction means on said tire facing surface of said end portion being substantially conically shaped projections, said projections being disposed in said hollow ridges.

9. A traction pad as claimed in claim 1, wherein said plate and said end portion provide a wedge shaped configuration.

* * * * *